US009906553B1

(12) United States Patent
Ainslie et al.

(10) Patent No.: US 9,906,553 B1
(45) Date of Patent: Feb. 27, 2018

(54) PERSONALIZED PRIVACY WARNINGS

(71) Applicant: Google Inc., Mountain View, CA (US)

(72) Inventors: Alex Neely Ainslie, San Francisco, CA (US); Alan Bettes, Berkeley, CA (US)

(73) Assignee: Google LLC, Mountain View, CA (US)

( * ) Notice: Subject to any disclaimer, the term of this patent is extended or adjusted under 35 U.S.C. 154(b) by 369 days.

(21) Appl. No.: 14/320,482

(22) Filed: Jun. 30, 2014

(51) Int. Cl.
*H04L 29/06* (2006.01)

(52) U.S. Cl.
CPC ........ *H04L 63/1475* (2013.01); *H04L 63/145* (2013.01); *H04L 63/1408* (2013.01); *H04L 63/1416* (2013.01); *H04L 63/1441* (2013.01); *H04L 63/1458* (2013.01)

(58) Field of Classification Search
CPC ............. H04L 63/1416; H04L 63/1408; H04L 63/1475; H04L 63/1441; H04L 63/145; H04L 63/1457
USPC .......................................................... 726/22
See application file for complete search history.

(56) References Cited

U.S. PATENT DOCUMENTS

| 8,887,245 | B1* | 11/2014 | Wiltzius | .............. | H04L 63/1433 |
| | | | | | 726/25 |
| 2006/0253583 | A1* | 11/2006 | Dixon | ................. | H04L 63/1441 |
| | | | | | 709/225 |
| 2014/0380480 | A1* | 12/2014 | Tang | ..................... | H04L 63/101 |
| | | | | | 726/24 |
| 2015/0269590 | A1* | 9/2015 | Patton | .................... | G06Q 30/02 |
| | | | | | 705/14.73 |

OTHER PUBLICATIONS

Felt, Adrienne Porter, et al. "Experimenting at scale with google chrome's SSL warning." Proceedings of the 32nd annual ACM conference on Human factors in computing systems. ACM, 2014.*

* cited by examiner

*Primary Examiner* — Mahfuzur Rahman
*Assistant Examiner* — Narciso Victoria
(74) *Attorney, Agent, or Firm* — McDermott Will & Emery LLP

(57) ABSTRACT

A web browser detects a network privacy threat associated with communications for retrieving a resource from a remote system before the resource is retrieved from the remote system. In connection with detecting the network privacy threat, the web browser automatically retrieves personal information associated with a user of the computing device, generates a privacy threat warning comprising a representation of the retrieved personal information, a representation of the remote system, and a representation of a third-party threat positioned in-between the representation of the personal information and the representation of the remote system, and provides the privacy threat warning for display at the computing device before retrieving the resource from the remote system.

17 Claims, 5 Drawing Sheets

PERSONALIZED PRIVACY WARNINGS

BACKGROUND

Hypertext Transfer Protocol Secure (HTTPS) uses an added security measure (e.g., an encryption layer) to protect internet traffic. When a problem with the security measure is detected some browsers may display an interstitial security warning message to alert the user of the problem. The warning message may not provide specific security details, but rather indicate that the connection failed in some aspect or that the web page is "not the page you're looking for." The warning message may provide an option to return to the originating page or to "proceed" despite the warning message. It has been found that, despite the display of warning messages, most users click "proceed," ignoring the possibility that their personal information may be at risk.

SUMMARY

The subject technology provides a system and computer-implemented method for identifying a threat to a user's personal information on a failure of an online security measure. According to various aspects, the method may include detecting, at a computing device, a network privacy threat associated with communications for retrieving a resource from a remote system before the resource is retrieved from the remote system, retrieving personal information associated with a user of the computing device, generating a privacy threat warning comprising a representation of the retrieved personal information, a representation of the remote system, and a representation of a third-party threat positioned in-between the representation of the personal information and the representation of the remote system, and providing the privacy threat warning for display at the computing device before retrieving the resource from the remote system. Other aspects include corresponding systems, apparatuses, and computer program products for implementation of the computer-implemented method.

In various aspects, a computer program product tangibly embodied in a computer-readable storage device comprises instructions that, when executed by a computing device, cause a computing device to detect, at a computing device, a network privacy threat between a web browser operating on the computing device and a remote system before a resource is retrieved by the web browser from the remote system, retrieve personal information associated with a user of the computing device, generate a privacy threat warning comprising a representation of the retrieved personal information, a representation of the remote system, and a representation of a third-party threat positioned in-between the representation of the personal information and the representation of the remote system, and provide the privacy threat warning for display in the web browser. Other aspects include corresponding systems, apparatuses, and computer program products for implementation of the machine-readable medium.

In further aspects, a system may include one or more processors and a memory. The memory may include instructions that, when executed by the one or more processors, cause the one or more processors to facilitate the steps of detecting a network privacy threat between a web browser and a remote system before a resource is retrieved by the web browser from the remote system, retrieving personal information associated with a user of the web browser, generating a privacy threat warning comprising a representation of the retrieved personal information, a representation of the remote system, and a representation of a third-party threat positioned in-between the representation of the personal information and the representation of the remote system, and providing the privacy threat warning for display in the web browser, wherein the privacy threat warning comprises a display of a first selectable option to prevent the resource from being retrieved from the remote system and a second selectable option to continue to retrieve the resource from the remote system.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
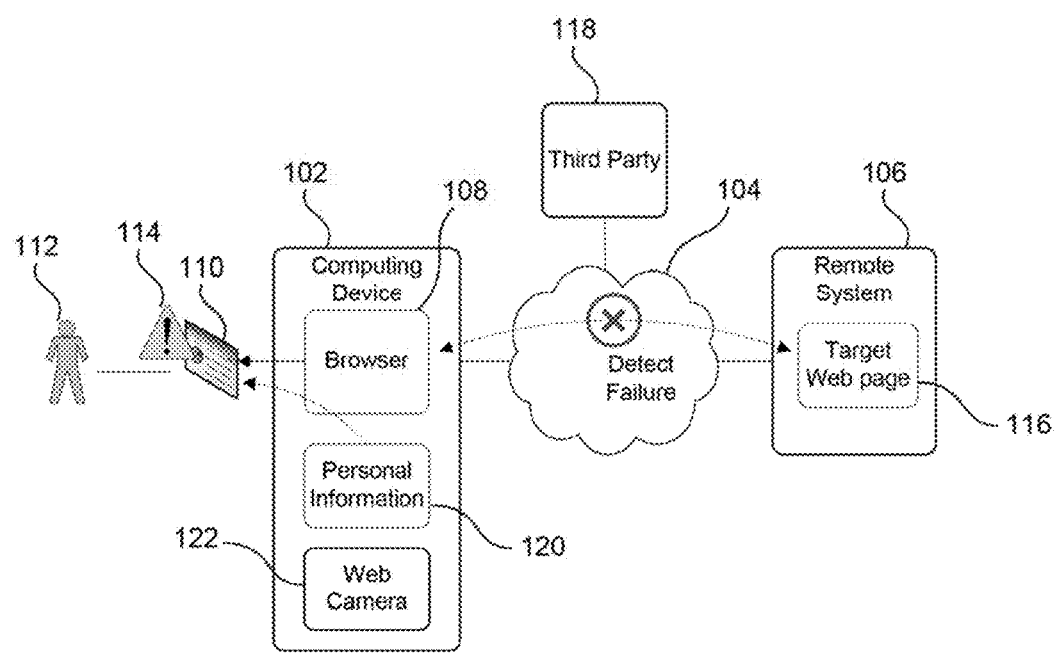
FIG. 1 depicts example computing devices and associated data flows related to detecting a privacy threat and providing a personalized warning related to the privacy threat.

FIG. 1 depicts example computing devices and associated data flows related to detecting a privacy threat (e.g., a threat to the security of a transmission) and providing a personalized warning related to the privacy threat according to various aspects of the subject technology. A computing device 102 is operably connected to a network 104, which is also operably connected to a remote system 106. In one or more implementations, computing device 102 may include such devices as a laptop or notebook computer, tablet computer, smart phone, personal data assistant, augmented-reality glasses, touch screen or television with one or more processors embedded therein or coupled thereto, or any other sort of electronic device with the ability to process executable instructions and data. Remote system 106 may be representative of a single computing device or group of computing devices, including web servers and/or databases, configured, for example, to deliver web content that can be accessed through the Internet.

Generally, network 104 may include the Internet. Network 104 may be, for example, implemented as a WAN, LAN, or any other network consisting of one or multiple networking technologies (such as satellite, cellular, cable, DSL, optical network, Ethernet over twisted pairs, and others), and which deploys one or multiple networking protocols for transferring data. Network 104 may also include, but is not limited to, any one or more of the following network topologies, including a bus network, a star network, a ring network, a mesh network, a star-bus network, a tree or hierarchical network, and the like. In some implementations, network 104 may also be a wireless area network (e.g., 802.11, Bluetooth, infrared, Wireless USB, and the like). Computing device 102 may be operably connected to the Internet via a gateway device such as a local router and/or WiFi receiving station, for example, by a wired or wireless connection.

In various implementations, computing device 102 is configured to provide a web browser 108. Web browser 108 is used, for example by a user 110 of computing device 102, to access resources and content made available by web servers and other devices made available to computing device 102 over network 104. According to various examples herein, web browser 108 provides a user interface 110, including dynamically displayed data and controls for interacting with remote applications. User interface 102 may include, for example, controls provided by the web browser and/or one or more web pages displayed by the web browser. A user 112 may interact with user interface 110 to retrieve and/or manipulate data related to web browser 108 and/or a displayed web page.

Web browser 108 is configured to a show privacy threat warning 114 to users in the event of a detected privacy threat. In one or more implementations, web browser 108 displays a bypassable warning that discourages a user from continuing with a browser navigation before, for example, an online resource is accessed and/or downloaded by web browser 108. There are various warning types. In one example, web browser 108 may obtain or be provided a list of suspicious (malware or phishing) sites from certain centralized servers configured with software for facilitating a safe browsing environment, for example, over the Internet. If a user tries to visit a site that is on the list, the browser contacts the centralized servers to confirm that the site is still on the list, and if the site is still on the list then web browser 108 presents a warning.

The Secure Sockets Layer (SSL/TLS) protocol generally provides secure channels between browsers and web servers. In one or more implementations, web browser 108 may verify a server's identity by validating a public-key certificate associated with the server. A failure of the validation may indicate a privacy threat. This validation may fail for a number of reasons, and web browser 108 may not be able to distinguish from benign security problems such as server misconfigurations and more malicious attacks such as a man-in-the-middle attack. Accordingly, web browser 108 may present user 112 with a general warning, providing the option to bypass the warning in the case the warning is a false positive. Many such sites use the SSL protocol to identify themselves cryptographically and prevent fraud. In this regard, a warning may be displayed when a user connects to a server whose SSL certificate does not match the address of the server. While a warning may provide some protection providing the user to not form a connection with the unverified server, SSL by itself generally cannot offer protection if a user ignores the warning about an invalid SSL server certificates.

Web browser 108 may display a security warnings based on security settings set in the web browser's preferences. The appearance of the privacy threat warning 114 may differ slightly depending on the setting and/or the browser type. For example, a first web browser may display a slightly different popup window than a second web browser.

According to various implementations of the subject technology, user 10 may attempt to navigate web browser 108 to a target web page 116 located on remote system 106. If a security measure (e.g., SSL) fails, a personalized privacy threat warning or dialog 114 may be displayed to user 112 before the user has the opportunity to continue navigation to target web page 116, without the assurance of the security measure. The failure of the security measure may include, for example, failure of a SSL implementation for a current connection, an indication that the user is being deliberately targeted (e.g., a man-in-the middle attack) by a third-party 118, determination that target web page 116 is on a malware or phishing list, or other identified threat. Failure of SSL may include, for example, a failure of the security handshaking, a problem with the security certificate (e.g. invalid, unknown, or expired), and the like.

In various implementations, privacy threat warning 114 may be personalized based on personal information 120 for the user and/or information known about target web page 116 (e.g., a uniform resource locator (URL) or internet protocol (IP) address for the page, network "who is" information, and the like). Personal information 120 may be stored within a database or local memory associated with web browser 108, on computing device 102 or a remote server (e.g., in a data cloud associated with a user account), and may include data related to user 110. Web browser 108 is configured to access personal information 120 for use in privacy threat warning 114 on the consent of user 110. For example, web browser 108 may include a browser settings screen in which user 112 or other user of web browser 108 may configure security and privacy settings, including the ability of web browser to access personal information 120. In some implementations, user 110 may opt-in to allowing web browser 108 to access personal information 120, or in some implementations user 110 may be provided the opportunity to opt-out of allowing web browser 108 to access personal information 120 (e.g., when the information is first accessed by web browser 108).

In some implementations, personal information 120 may include a picture, video, or other representation of user 110. In some implementations, personal information 120 may include profile information stored in an online social network application. In this regard, web browser 108 may be configured to access the social network profile for user 112 if the user is signed-in to the social network application when the privacy threat is detected. For example, a profile picture associated with the social network profile may be used in a security warning when user 110 is signed into web browser 108 using the social network account. In one or more implementations, computing device 102 may be configured with or to use a web camera 122 to obtain pictures and/or video, which may or may not include images of user 110. As will be described further, images obtained from web camera 122 may be stored in, or together with and/or compliment, personal information 120.

Figure 2:
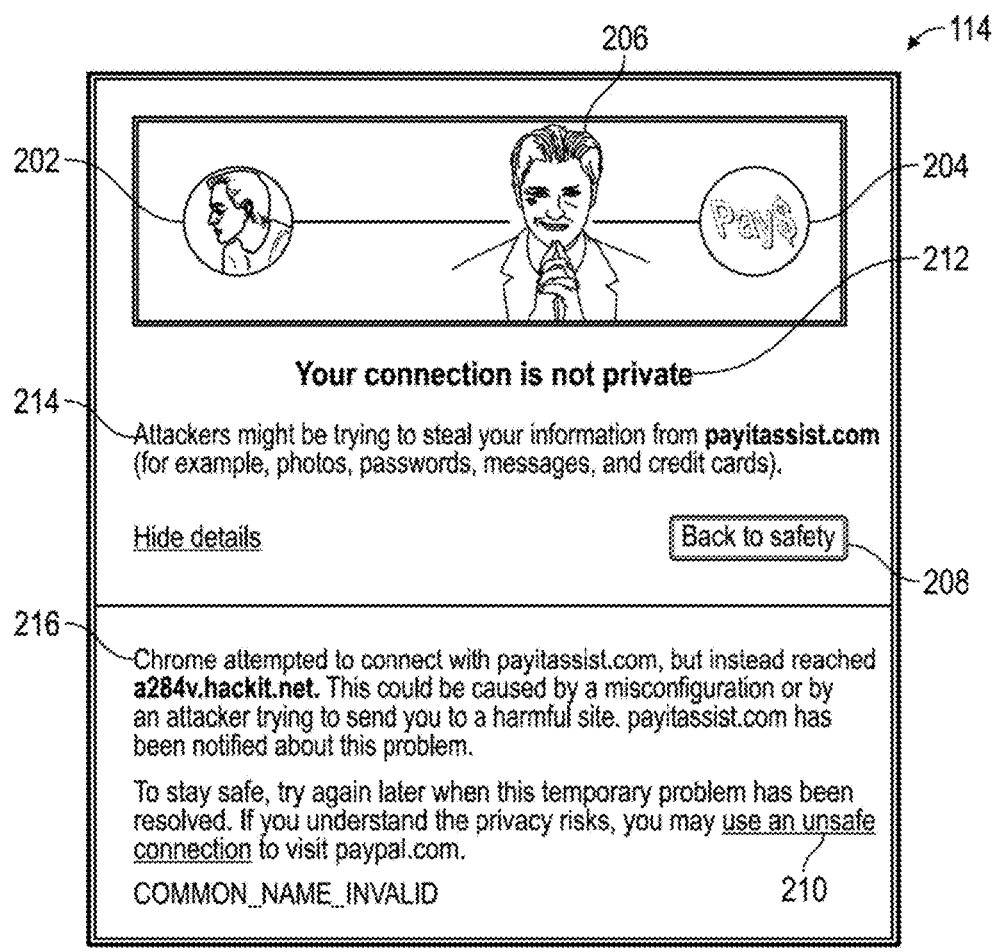
FIG. 2 depicts an example web browser including a first example personalized privacy threat warning related to a privacy threat detected by the web browser.

FIG. 2 depicts an example web browser 108 including a first example personalized privacy threat warning 114 related to a privacy threat detected by the web browser according to various aspects of the subject technology. In the depicted example, privacy threat warning 114 is implemented as a pop-up dialog, within browser 108, that includes a representation of the relationship between the user, the target web page, and the threat to the user's information. As shown by FIG. 2, user 112 may represented by a picture 202 of the user (e.g., the user's face), and target web page 116 may be represented by a brand identification 204 for an entity associated with target web page 116 (or associated website). The threat may be represented by a depiction 206 of a person or other third-party 118 in-between the representation of user 112 and the representation of target web page 116.

In one or more implementations, picture 202 of user 112 may be retrieved dynamically at runtime from a profile. The profile may be a profile stored locally on computing device 102, or may be a profile stored on a remote server or computing device, for example, hosting a social network application. In one example, web browser 108 may include programming instructions that, when authorized by user 112, communicate with a file system of local computing device 102 via an Application Programming Interface (API). In another example, web browser 108, when authorized by user 112, may be configured to register active user accounts to which user 112 has been authenticated, and to operably connect to a social network using one of the active user accounts associated with the social network. In this manner, web browser may retrieve pictures, videos, and other information in the file system of computing device 102, or posted to the social network application in connection with the user account.

In some implementations, and when appropriately configured by user 110, on identifying a privacy threat (e.g., failure of a security measure) web browser 108 may be configured to access web camera 122, snap a live picture of the user and include the picture in privacy threat warning 114 (e.g., as the representation of the user). Web browser 108 may be configured with programming instructions to access, when authorized by user 112, an API associate with the web camera for control and operation of web camera 122, retrieve an image generated by web camera 122, and provide the image for display in privacy threat warning 114. Web camera 122 may also be used to stream a live video of the user within the warning message. Additionally or in the alternative, the subject technology may access GPS hardware integrated with and/or operatively connected to computing device 102, or use IP-based positioning to determine the user's current geographic location, and then display the user's position on a map and indicate that by completing the navigation to the target web page the user's position may be disclosed to surreptitious third-parties.

In the depicted example, a first selectable option 208 is provided to return the browser to a safe navigational state (e.g., a button or hyperlink) and a second selectable option 210 (e.g., a button or hyperlink) is provided to continue the online navigation for retrieving the resource. First selectable option 208 may recite "return to safety," and the second selectable option may recite "continue using an unsafe connection." Privacy threat warning 114 may further provide an alert highlight 212 providing an emphasized yet concise explanation 214 of the detected threat, including language that, for example, indicates that attackers may be attempting to steal or otherwise copy information being transmitted to target web page 116 or the brand associated with the web page. Privacy threat warning 114 may further provide detailed threat information 216 that may describe the threat in layman's terms and include connection-related information such as the web address to which the connection is being directed, particularly if the web address is different than what would otherwise be expected to be associated with target web page 116 (e.g., by domain name service (DNS) lookup of target web page 116). Privacy threat warning 114 may also provide specific information regarding the detection of a potential or actual installation of malware, or navigation to a web page containing malware.

Figure 3A:
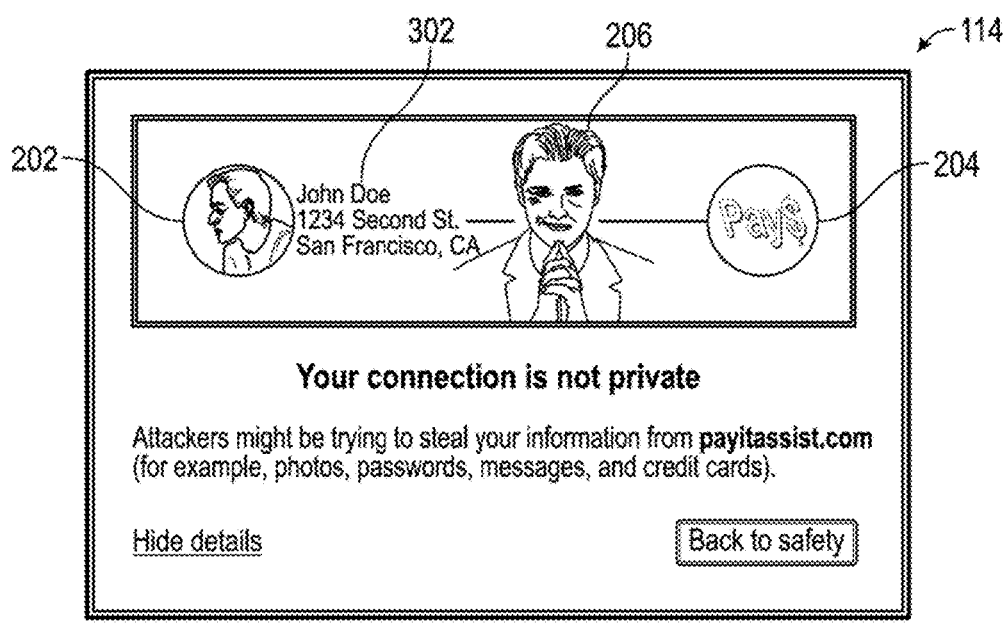
FIGS. 3A and 3B depict an example web browser including a second and third example personalized privacy threat warning related to a privacy threat detected by the web browser.
Figure 3B:
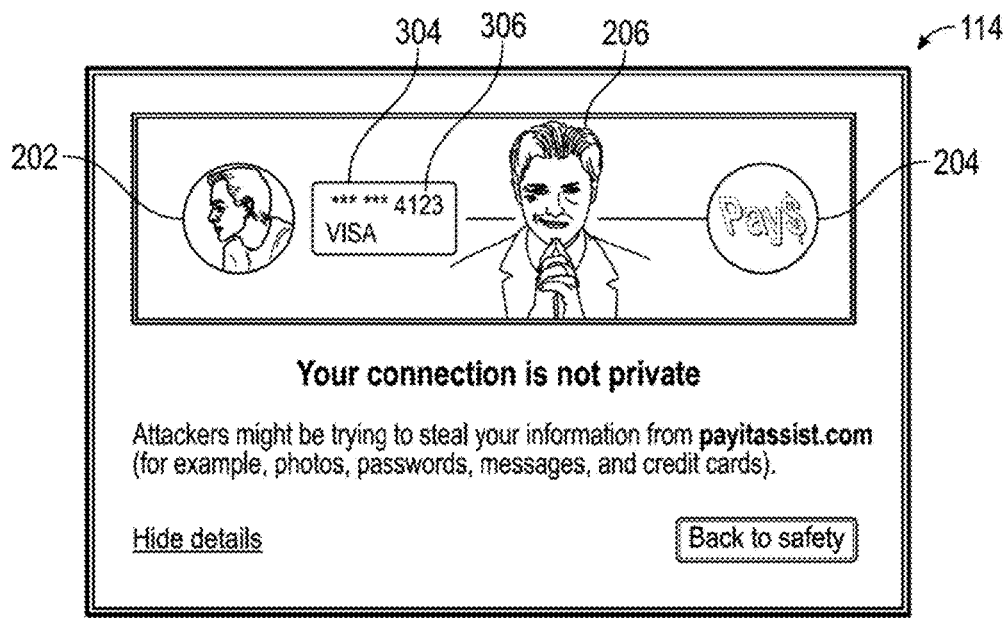

FIGS. 3A and 3B depict an example web browser 108 including a second and third example personalized privacy threat warning 114 related to a privacy threat detected by the web browser according to various aspects of the subject technology. To further indicate the threat to the personal information of user 110, privacy threat warning 114 may identify and display to the user a portion of sensitive user information that would be subject to interception should the user proceed with the navigation to the target web page. With regard to FIG. 3A, privacy threat warning 114 may retrieve, from personal information 120, and include a personal address 302 of user 110. For example, the user's name, home or work address, and/or email address may be displayed. Personal address 302 may be displayed adjacent to or in connection with picture 202 of the user 112. Personal address 302 may be obtained from an online account or profile of user 112 or from information already known to the browser, for example, obtained from auto-fill information.

With regard to FIG. 3B, privacy threat warning 114 may retrieve from personal information 120 and include a portion of the user's credit card number 304 (e.g., obtained from auto-fill information). Credit card number 304 may be displayed adjacent to or in connection with picture 202 of the user 112. Credit card number 304 (or address or other personal information), when displayed adjacent to picture 202 of user 110 and/or in connection with depiction 206 of third-party 118 visually presents an immediate threat to highly sensitive user information. As shown by FIGS. 3A and 3B, privacy threat warning 114 may convey to user 110 that a devious-looking person or third-party is in-between user 110 and a target web page 116, and will be able to see and easily obtain credit card number 304 (or other personal information displayed by privacy threat warning 114).

As shown by FIG. 3B, privacy threat warning 114 may also identify what type of credit card is being used (e.g., VISA or MASTERCARD) and display credit card number 304 (or portion thereof) in a visual representation 306 of a credit card to create a realistic representation of the user's credit card information being at risk to interception by third-party 118. Showing a picture of the user in connection with the user's credit card and a surreptitious third-party strongly indicates the threat to the user's private information.

Figure 4:
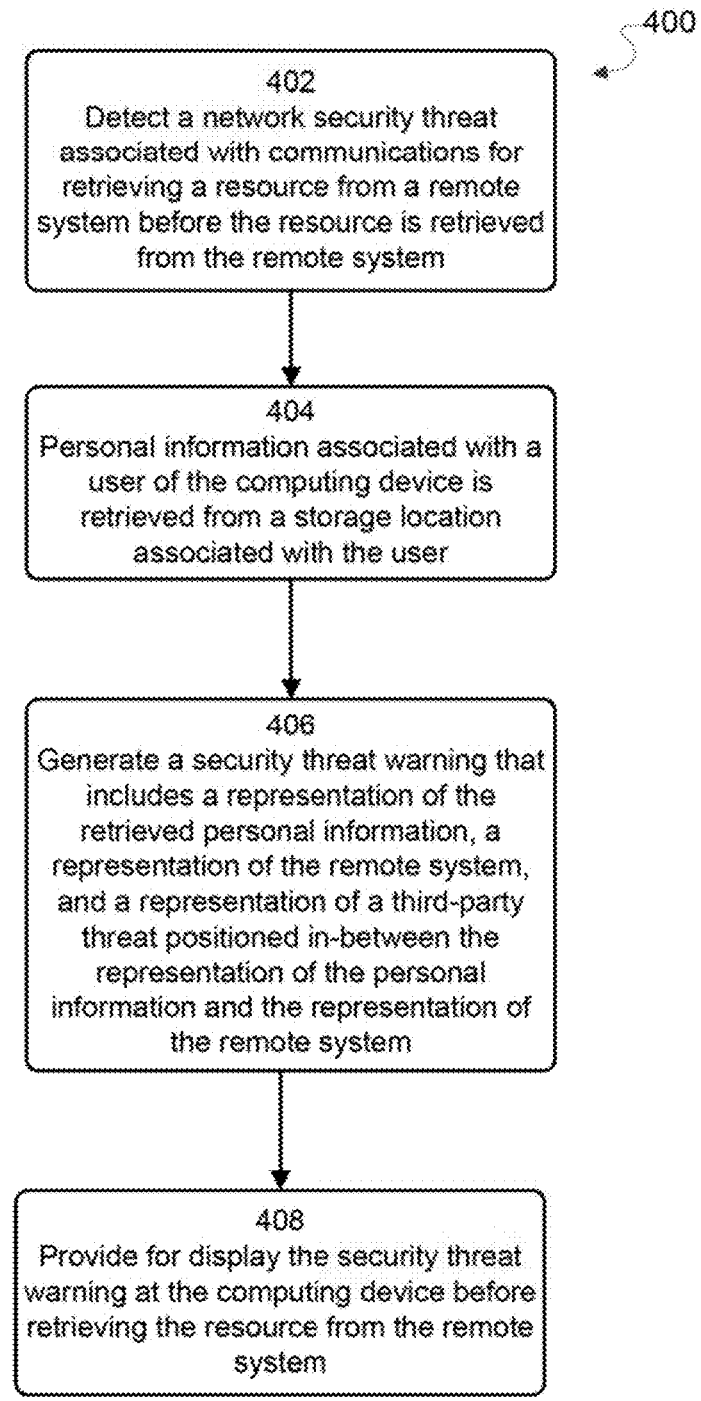
FIG. 4 illustrates a flow diagram of an example process for providing a personalized privacy threat warning related to a privacy threat detected by the web browser.

FIG. 4 illustrates a flow diagram of an example process 400 for providing a personalized privacy threat warning related to a privacy threat detected by the web browser according to one or more aspects of the subject technology. For explanatory purposes, example process 400 is described herein with reference to the various components of FIG. 1 and example warning messages of FIGS. 2 and 3; however, example process 400 may also be applicable to other components and/or component data flows and process described herein. Further for explanatory purposes, the blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

According to process 200 of FIG. 4, a computing device 102 detects a network privacy threat associated with communications for retrieving a resource from a remote system 106 before the resource is retrieved from the remote system (402). The communications may involve, for example, an online navigation via web browser 108 for retrieving the resource.

Personal information 120 associated with a user of the computing device is retrieved from a storage location associated with the user (404). In one or more implementations, the personal information may include a representation of the user (e.g., a picture such as an image or video stream). In this regard, personal information 120 may be retrieved by web browser 108 accessing a web-based user profile associated with the user, and retrieving a picture of the user from the web-based user profile for use as in the representation of the user. Additionally or in the alternative, personal information 120 may include at least a portion of a credit card number 304 associated with the user. The at least a portion of a credit card number may be retrieved, for example, from auto-fill information within web browser 108. In one or more implementations, web browser 108 may determine a type of credit card for the credit card number. For example, web browser 108 may query a credit card system using a portion of the credit card number relevant to determining the type of a credit card. The credit card system may then respond with the type of credit card (e.g., VISA or MASTERCARD), and the information may be provided in connection with personal information 120.

Additionally or in the alternative, personal information 120 may include an address associated with the user. The address may be a home or business address, latitude and/or longitude, geographic coordinate, internet protocol (IP) address or other web address, location on a map, or any other type of address information suitable for describing a location of the user. Additionally or in the alternative personal information may include a picture of the user retrieved from web camera 122. Accordingly, web browser 108 may, in response to or in connection with detecting the network privacy threat, access web camera 122 using an API for the web camera, and control web camera 122 to take one or more pictures. In this manner, web camera 122 may take one or more pictures of user 110 for personal information 120.

According to process 400, a privacy threat warning 114 (e.g., a visual privacy threat representation) is generated that includes a representation of the retrieved personal information, a representation of the remote system, and a representation of a third-party threat positioned in-between the representation of the personal information and the representation of the remote system (406). Accordingly, privacy threat warning 114 is a graphical representation of a real threat to user data. According to various aspects, privacy threat warning 114 may be represented by a depiction 206 of a person or other third-party 118 in-between the representation of user 112 and the representation of target web page 116.

Any of the information previously described as being provided with or in connection with personal information 120 may be displayed by privacy threat warning 114. For example, the privacy threat warning 114 may include one or more pictures of user 110 in connection with a portion of the user's credit card number 304. The privacy threat warning may include a display of a representation of the credit card corresponding to the determined type of credit card, with the representation of the credit card including the at least a portion of the credit card number. A live video stream may be provided by web camera 12, and the live video stream may be provided as the representation of the user in the privacy threat warning.

The privacy threat warning is provided for display at the computing device before retrieving the resource from the remote system (408). According to various implementations, the privacy threat warning may be displayed by web browser, for example, as a pop-up window or as a newly-generated tab. The privacy threat warning may include, for example, a display of a first selectable option to prevent the resource from being retrieved from the remote system and a second selectable option to continue to retrieve the resource from the remote system The above-described features and concepts of example process 400 have been discussed with regard to the operation of a web browser. However, the above-described features and concepts of process 400 may be applied in the same or similar manner to any operating system that includes data transmissions that may be secured over a network. For example, an operating system of a mobile device (e.g., a smart phone) could provide and/or display connection information for applications as well as provide privacy warnings related to transmitted and/or received data, for example, from the operating system level.

Many of the above-described features of process 400 and related features and applications, may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
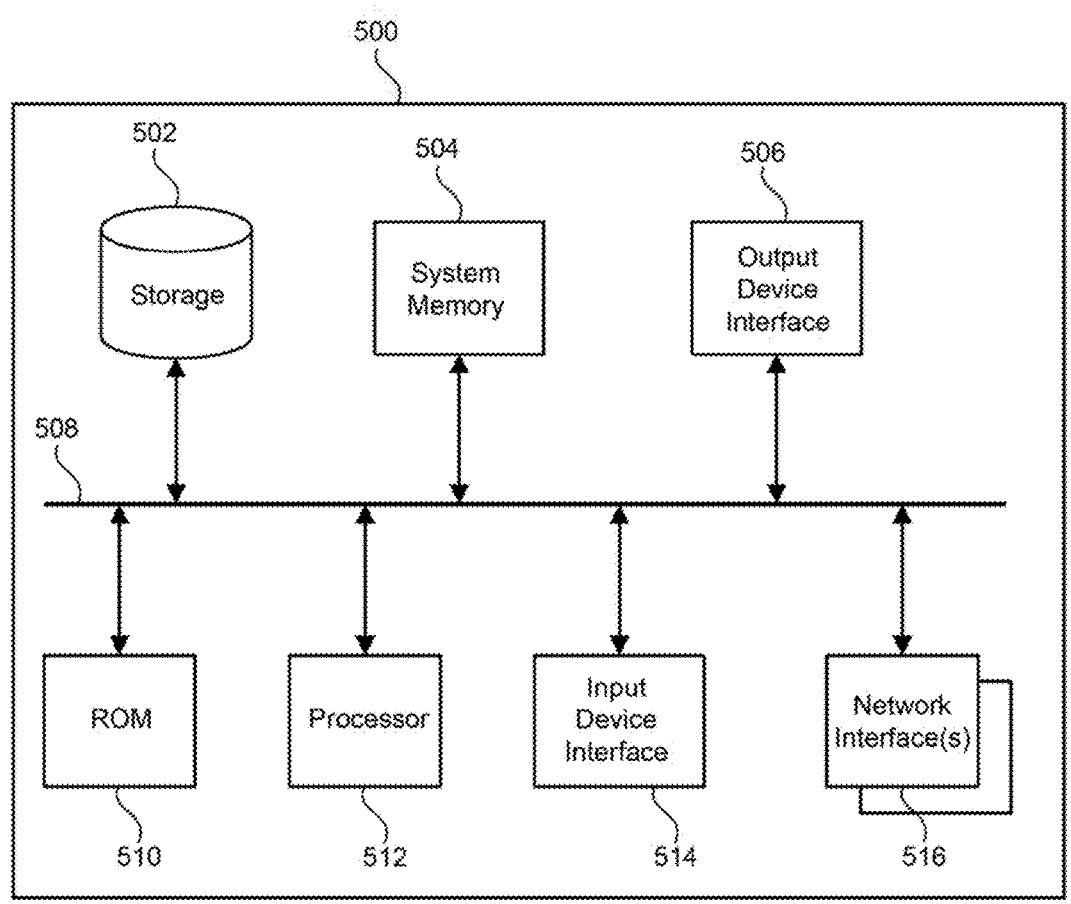
FIG. 5 is a diagram illustrating an example electronic system for use in connection with providing a personalized privacy threat warning related to a privacy threat detected by the web browser.

FIG. 5 is a diagram illustrating an example electronic system 500 for use in connection with providing a personalized privacy threat warning related to a privacy threat detected by the web browser, according to one or more aspects of the subject technology. Electronic system 500 may be a computing device for execution of software associated with the operation one or more portions or components and processes provided by FIG. 1-3. In various implementations, electronic system 500 may be representative of computing device 102, remote system 106, a third-party system 118, or a different system, server, computer, phone, PDA, laptop, tablet computer, touch screen or television with one or more processors embedded therein or coupled thereto, or any other sort of electronic device.

Electronic system 500 may include various types of computer readable media and interfaces for various other types of computer readable media. In the depicted example, electronic system 500 includes a bus 508, processing unit(s) 512, a system memory 504, a read-only memory (ROM) 510, a permanent storage device 502, an input device interface 514, an output device interface 506, and one or more network interfaces 516. In some implementations, electronic system 500 may include or be integrated with other computing devices or circuitry for operation of the various components and processes previously described.

Bus 508 collectively represents all system, peripheral, and chipset buses that communicatively connect the numerous internal devices of electronic system 500. For instance, bus 508 communicatively connects processing unit(s) 512 with ROM 410, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touch-screen that functions as both input and output devices.

Finally, as shown in FIG. 5, bus 508 also couples electronic system 500 to a network (not shown) through network interfaces 516. Network interfaces 516 may include, for example, a wireless access point (e.g., Bluetooth or WiFi). Network interfaces 516 may also include hardware (e.g., Ethernet hardware) for connecting the computer to a part of a network of computers such as a local area network ("LAN"), a wide area network ("WAN"), or an Intranet, or a network of networks, such as the Internet. Any or all components of electronic system 500 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method, comprising:
   detecting, at a computing device, a network privacy threat associated with an online navigation via a web browser for retrieving a resource from a remote system initiated by a user of the computing device, the network privacy threat indicated by a failure of a security measure including a security certificate before the resource is retrieved from the remote system;
   in response to the detecting the network privacy threat, retrieving from a storage location personal information associated with the user of the computing device;
   generating a personalized privacy threat warning based on the retrieved personal information and the network privacy threat, the personalized privacy threat warning comprising a representation of the retrieved personal information, a representation of the remote system, and a representation of a third-party threat positioned in-between the representation of the personal information and the representation of the remote system; and
   providing the personalized privacy threat warning for display by the web browser at the computing device before retrieving the resource from the remote system, the personalized privacy threat warning comprising a display of a first selectable option to prevent the resource from being retrieved from the remote system and a second selectable option to continue to retrieve the resource from the remote system.

2. The computer-implemented method of claim 1, wherein the personal information comprises at least a portion of a credit card number associated with the user.

3. The computer-implemented method of claim 2, further comprising:
   determining a type of credit card for the credit card number,
   wherein the personalized privacy threat warning comprises a display of a representation of a credit card corresponding to the determined type of credit card, the representation of the credit card comprising the at least a portion of the credit card number.

4. The computer-implemented method of claim 3, wherein the at least a portion of a credit card number is retrieved from auto-fill information within the web browser.

5. The computer-implemented method of claim 1, wherein the personal information comprises at least a portion of an address associated with the user.

6. The computer-implemented method of claim 1, wherein the personal information comprises a representation of the user, and retrieving the personal information comprises:
   accessing a web-based user profile associated with the user; and
   retrieving a picture of the user from the web-based user profile for use as in the representation of the user.

7. The computer-implemented method of claim 1, wherein the personal information comprises a representation of the user, and retrieving the personal information comprises:
   controlling a web camera to take one or more pictures; and
   providing the one or more pictures for use in the representation of the user.

8. The computer-implemented method of claim 7, wherein the one or more pictures comprises a live video stream, and the live video stream is provided as the representation of the user in the personalized privacy threat warning.

9. A computer program product tangibly embodied in a computer-readable storage device and comprising instructions that, when executed by a computing device, cause the computing device to:
   detect, at a computing device, a network privacy threat associated with an online navigation via a web browser for retrieving a resource from a remote system initiated by a user of the computing device, the network privacy threat indicated by a failure of a security measure including a security certificate before the resource is retrieved from the remote system;
   in response to the detecting the network privacy threat, retrieve from a storage location personal information associated with the user of the computing device;
   generate a personalized privacy threat warning based on the retrieved personal information and the network privacy threat, the personalized privacy threat warning comprising a representation of the retrieved personal information, a representation of the remote system, and a representation of a third-party threat positioned in-between the representation of the personal information and the representation of the remote system; and
   provide the personalized privacy threat warning for display by the web browser before retrieving the resource from the remote system, the personalized privacy threat warning comprising a display of a first selectable option to prevent the resource from being retrieved from the remote system and a second selectable option to continue to retrieve the resource from the remote system.

10. The computer program product of claim 9, wherein the personal information comprises at least a portion of a credit card number associated with the user.

11. The computer program product of claim 10, wherein the instructions, when executed by the computing device, further causing the computing device to:
    determine a type of credit card for the credit card number,
    wherein the personalized privacy threat warning comprises a display of a representation of a credit card corresponding to the determined type of credit card, the representation of the credit card comprising the at least a portion of the credit card number.

12. The computer program product of claim 11, wherein the at least a portion of a credit card number is retrieved from auto-fill information within the web browser.

13. The computer program product of claim 9, wherein the personal information comprises the at least a portion of an address associated with the user.

14. The computer program product of claim 9, wherein the personal information comprises a representation of the user, and retrieving the personal information comprises:
   accessing a web-based user profile associated with the user; and
   retrieving a picture of the user from the web-based user profile for use as in the representation of the user.

15. The computer program product of claim 9, wherein the personal information comprises a representation of the user, and retrieving the personal information comprises:
   controlling a web camera to take one or more pictures; and
   providing the one or more pictures for use in the representation of the user.

16. The computer program product of claim 15, wherein the one or more pictures comprises a live video stream, and the live video stream is provided as the representation of the user in the personalized privacy threat warning.

17. A system, comprising:
   one or more processors; and
   a memory including instructions that, when executed by the one or more processors, cause the one or more processors to facilitate the steps of:
      detecting, at a computing device, a network privacy threat associated with an online navigation via a web browser for retrieving a resource from a remote system initiated by a user of the computing device, the network privacy threat indicated by a failure of a security measure including a security certificate before the resource is retrieved from the remote system;
      in response to the detecting the network privacy threat, retrieving from a storage location personal information associated with the user of the web browser;
      generating a personalized privacy threat warning based on the retrieved personal information and the network privacy threat, the personalized privacy threat warning comprising a representation of the retrieved personal information, a representation of the remote system, and a representation of a third-party threat positioned in-between the representation of the personal information and the representation of the remote system; and
      providing the personalized privacy threat warning for display by the web browser, wherein the personalized privacy threat warning comprises a display of a first selectable option to prevent the resource from being retrieved from the remote system and a second selectable option to continue to retrieve the resource from the remote system.

* * * * *